US011444306B2

(12) United States Patent
Wainright et al.

(10) Patent No.: US 11,444,306 B2
(45) Date of Patent: Sep. 13, 2022

(54) COMPOSITE MEMBRANES FOR FLOW BATTERIES

(71) Applicant: CASE WESTERN RESERVE UNIVERSITY, Cleveland, OH (US)

(72) Inventors: Jesse S. Wainright, Willoughby Hills, OH (US); Gary E. Wnek, Cleveland, OH (US); Enoch A. Nagelli, Cleveland, OH (US); Robert Savinell, Solon, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 107 days.

(21) Appl. No.: 17/099,096

(22) Filed: Nov. 16, 2020

(65) Prior Publication Data

US 2021/0210779 A1   Jul. 8, 2021

Related U.S. Application Data

(63) Continuation of application No. 16/080,080, filed as application No. PCT/US2017/019644 on Feb. 27, 2017, now abandoned.

(60) Provisional application No. 62/300,323, filed on Feb. 26, 2016.

(51) Int. Cl.
*H01M 4/36* (2006.01)
*H01M 8/18* (2006.01)
*H01B 1/12* (2006.01)
*H01M 4/86* (2006.01)

(52) U.S. Cl.
CPC ............ *H01M 8/188* (2013.01); *H01B 1/122* (2013.01); *H01M 4/8657* (2013.01); *H01M 2300/0091* (2013.01); *Y02E 60/50* (2013.01)

(58) Field of Classification Search
None
See application file for complete search history.

(56) References Cited

U.S. PATENT DOCUMENTS

| 4,614,575 A | 9/1986 | Juda et al. |
| 5,211,827 A | 5/1993 | Peck |
| 2003/0059657 A1 | 3/2003 | Stone et al. |

(Continued)

FOREIGN PATENT DOCUMENTS

| CN | 105226222 A | 1/2016 |
| JP | S62223984 A | 10/1987 |

(Continued)

OTHER PUBLICATIONS

International Search Report and Written Opinion dated Jun. 15, 2017; International Patent Application No. PCT/US2017/019644 filed on Feb. 27, 2017.

(Continued)

*Primary Examiner* — Raymond Alejandro
(74) *Attorney, Agent, or Firm* — McDonald Hopkins LLC

(57) ABSTRACT

A composite membrane for use in flow batteries is contemplated. The membrane comprises a hydrogel, such as poly (vinyl alcohol), applied to a polymeric microporous film substrate. This composite is interposed between two half cells of a flow battery. The resulting membrane and system, as well as corresponding methods for making the membrane and making and operating the system itself, provide unexpectedly good performance at a significant cost advantage over currently known systems.

15 Claims, 1 Drawing Sheet

(56) References Cited

U.S. PATENT DOCUMENTS

| | | | |
|---|---|---|---|
| 2005/0287436 A1 | 12/2005 | Kawashige et al. | |
| 2008/0274393 A1 | 11/2008 | Markoski et al. | |
| 2010/0040909 A1 | 2/2010 | Karamanev | |
| 2011/0274988 A1 | 11/2011 | Fan et al. | |
| 2012/0150006 A1 | 6/2012 | Lavanant | |
| 2013/0122334 A1 | 5/2013 | Visco et al. | |
| 2013/0141050 A1* | 6/2013 | Visco | H01M 4/38 429/535 |
| 2014/0227620 A1 | 8/2014 | Perry | |
| 2015/0249253 A1* | 9/2015 | Lee | H01M 8/0289 429/105 |
| 2015/0321146 A1 | 11/2015 | Lin | |
| 2017/0098851 A1* | 4/2017 | Kniajanski | H01M 8/2455 |

FOREIGN PATENT DOCUMENTS

| | | |
|---|---|---|
| JP | H06260183 A | 9/1994 |
| JP | 2000176260 | 6/2000 |
| WO | 9306626 A1 | 9/1991 |

OTHER PUBLICATIONS

European Patent Office, Extended European Search Report for Application No. 17757410.0, dated Sep. 11, 2018, 9 pages.

Cho et al., Polymer electrolyte composite membrane comprises polymer mixture comprising sulfonated hydrocarbon-based polymer having proton conductivity and fluorine-contain hydrophobic polymer, sulfonated silica and amphiphilic surfactant, Jun. 3, 2015.

* cited by examiner

COMPOSITE MEMBRANES FOR FLOW BATTERIES

CROSS REFERENCE TO RELATED APPLICATIONS

This application is a continuation of U.S. patent application Ser. No. 16/080,080 filed on Aug. 27, 2018, which itself claimed priority to Patent Cooperation Treaty patent application PCT/US2017/19644 filed on Feb. 27, 2017 and U.S. provisional patent application 62/300,323, filed on Feb. 26, 2016, all of which are incorporated by reference herein, and this disclosure was developed with funds received under a contract with the United States Department of Energy (contract DAR0000352), who may possess certain rights in this invention.

FIELD OF INVENTION

The present invention relates to the field of flow batteries and, more specifically, to a system and apparatus involving a composite membrane for use in such batteries, as well as a method of making and using any of the same.

BACKGROUND

A flow battery is a rechargeable battery that uses electrolytes moving ("flowing") through an electrochemical cell to convert chemical energy from the electrolyte into electricity (and vice versa when charging). The active materials used in flow batteries are generally composed of ionized metal salts or redox active organic compounds dissolved in a fluid, such as water or an organic solvent(s). Additional salts or acids, such as NaCl or HCl, may also be provided to the fluid so as to create a highly conductive electrolyte.

The electrolytes for flow batteries are typically stored in separate tanks and then pumped through individual cells of the flow battery in a controlled manner, usually according to the charge/discharge current applied. Multiple cells may be employed (i.e., "stacked"), in series or in parallel, in order to create the desired electrical characteristics for the battery.

When discharging, each cell consists of a positive (cathode) and negative (anode) electrode and a separating membrane. The electrodes catalyze the desired reactions. The membrane that allows the conduction of ions necessary to complete the electrical circuit, while preventing the electrodes from coming into contact. The separator should also prevent any mixing of the circulating positive and negative electrolytes and minimize the movement of species produced in an electrolyte during charging from crossing over or intermingling with the other components (e.g., the other electrolyte). Additional mechanical and control structures may be employed to generate and sustain the desired flow of electrolyte/reactants through the cell(s).

A true flow battery has all the active chemical species flowing through the battery and stored in the external tanks. Reduction-oxidation (redox) flow batteries, such as vanadium or iron/chromium redox batteries, store electrical energy in a chemical form and subsequently dispense the stored energy in an electrical form via a spontaneous reverse redox reaction. The discharged electrolyte can be flowed through a reactor cell with an external voltage source applied such that electrical energy is converted back to chemical energy.

'Hybrid' flow batteries have at least one of the active materials physically located within the cell/stack, such as the zinc metal in a zinc-bromine battery or iron in an all-iron battery, while the other active materials are dissolved in the electrolyte. Such hybrid flow batteries still utilize separate positive and negative electrolytes and require a separator or membrane.

A variety of chemistries have been employed in flow batteries. The typical cell voltages range from <1.0 up to ~2.4 volts, with hydrogen-lithium bromate, iron-chrome, all-iron, vanadium-vanadium sulfate (or mixed sulfate and chloride), sodium-bromine polysulfide and zinc-bromine serving as non-limiting examples.

In practice, flow batteries are similar to fuel cells, in that they rely upon electron transfer (rather than intercalation or diffusion). Similarly, flow batteries share characteristics with rechargeable conventional batteries, excepting that the active material of flow batteries may be easily replenished outside of the cell (e.g., in the storage tanks through the application of an appropriate electrical charge). As such, flow batteries present advantages over conventional batteries, which possess limited discharge capacity based upon the active material contained within the cell and, in the case of secondary batteries, possess relatively limited cycling capabilities owing to the inherent limitations of repeated intercalation. Flow batteries also present advantages in comparison to fuel cells because they do not require specialized catalysts and because reactants can be replenished via the application of electrical current, without any need for wholesale replacement of either the cell or the reactants. Nevertheless, to date, flow batteries have mostly found utility in larger, stationary applications and/or in combination with other power generation schemes, although a broad array of possibilities is anticipated.

Examples of flow batteries can be found in United States Patent Publication No. 2014/0227574; U.S. Provisional Patent Application No. 62/239,469 filed on Oct. 9, 2015 and International Patent Application No. US15/50676 filed on Sep. 17, 2015. The entirety of the disclosure in each of these documents may be incorporated by reference herein, and the inventors further reserve the right to attempt to establish priority claims to these applications to the fullest extent permitted by applicable law.

One of the most common membrane materials in use today is a sulfonated tetrafluoroethylene based fluoropolymer-copolymer sold by the E.I. du Pont de Nemours and Company based in Wilmington, Del. under the trade name NAFION. This material possesses a Teflon skeleton with acidic sulfonic groups, resulting in cationic conductivity, resistance to chemical reactivity and moderate temperatures and comparatively good water and gas permeability. However, the proprietary nature of the material also entails a relatively high cost, and NAFION® has poor conductivity for flow batteries relying upon ions other than proton-for-ionic charge movement (e.g., potassium, sodium, chloride, etc.).

Another approach to membranes is disclosed in United States Patent Publication No. 2013/011504. An ion exchange membrane is described for redox flow batteries. The membrane is made from a composition comprising an ion conductive material, such as an ion conductive monomer or polymer (e.g., quaternary ammonium salts), and a water soluble support. In some instances, non-effective ion materials selectively substituted in place of the ion conductive polymers. The resulting membrane is described as being useful in flow batteries having non-aqueous electrolytes and solvents.

Porous and microporous membranes have also received consideration for use in flow batteries. However, these materials are extremely sensitive to pressure differentials, insofar as their porous nature allows for liquid/fluid to pass through (as opposed to following the intended flow-path for the electrolyte(s) in question). Consequently, the use of porous membranes often requires additional components to monitor and adjust the pressure and flow of both electrolytes. To the extent pores may become physically obstructed, the resulting localized disparities in porosity present further challenges even if such control components are employed.

Given the foregoing, there is a need for a cost effective alternative to known membrane materials. Further, membranes that do not require close monitoring and adjustment of pressure differentials in a flow battery, especially via complex control components, would be welcome. A material that is more compatible with non-proton rich electrolytes and, more specifically, a material that exhibits selectivity between the various charge states of iron (e.g., $Fe^{2+}$, $Fe^{3+}$) or vanadium (e.g., $V^{2+}$, $V^{3+}$, $V^{4+}$, $V^{5+}$, etc.) and other multi-valent (i.e., other ionic species, beyond iron and/or vanadium, exhibiting several different states of valence) and/or cationic species (e.g., $K^+$, $Na^+$, $H^+$, etc.), are also needed.

SUMMARY OF INVENTION

In view of the foregoing, a membrane for flow batteries is contemplated. This membrane consists of a hydrogel-forming material (e.g., poly(vinyl alcohol), hereafter "PVA") and an optional porous polymeric material. This membrane is disposed between the half-cells of a flow battery to allow for the selective flow of ions through the membrane without relying on traditional ionomers. The membrane is expected to have particularly utility in the field of iron flow batteries, although its selectivity has utility in a wider range of multi-valent flow battery chemistries.

In certain aspects, a flow battery comprises any combination of the following features:
  a positive electrolyte flowing through a positive reaction chamber;
  a negative electrolyte flowing through a negative reaction chamber;
  a non-ionomeric membrane comprising a hydrogel physically separating the positive reaction chamber from the negative reaction chamber;
  wherein the membrane is ionically conductive but resistant to hydraulic crossover;
  wherein at least one of the positive and negative electrolytes comprises an aqueous solution;
  wherein at least one of the positive and negative electrolytes comprise a multi-valent ionic species;
  wherein the multi-valent species include at least one of: vanadium ($2^+$) ions, vanadium ($3^+$) ions, vanadium ($4^+$) ions, vanadium ($5^+$) ions, cuprous ions, cupric ions, ferric ions, and ferrous ions;
  wherein the hydrogel comprises poly(vinyl alcohol);
  wherein the hydrogel is selected from: poly(vinyl alcohol), poly(acrylic acid), poly(ethylene glycol), and combinations thereof;
  wherein the hydrogel effectively blocks the pores of a polymeric substrate;
  wherein the polymeric substrate is microporous;
  wherein the polymeric substrate consists of polyethylene, polypropylene, and combinations thereof;
  wherein the polymeric substrate has a void volume between 30% and 80%;
  wherein the polymeric substrate has a void volume exceeding 80%;
  wherein the membrane consists of hydrogel;
  wherein the pH of the positive and negative electrolytes is less than 3.0, more preferably less than 2.0, and most preferably less than 1.5; and
  wherein the hydrogel is at least one of: hydrolyzed, crystalline, semi-crystalline, and crosslinked.

In another aspect, a method for making a membrane for flow batteries may include any combination of the following features:
  providing a substrate having a plurality of pores forming a void volume;
  impregnating the pores with a hydrogel;
  treating the hydrogel to create a non-ionomeric but ionically conductive membrane;
  wherein the hydrogel is selected from: poly(vinyl alcohol), poly(acrylic acid), poly(ethylene glycol), and combinations thereof;
  wherein the treating the hydrogel includes at least one of thermal crosslinking, chemical crosslinking, photochemical crosslinking, and hydrolyzing the hydrogel;
  wherein the impregnating the pores comprises at least one of film casting, roll-to-roll casting, infiltration, and dip coating;
  wherein the impregnating the pores results in a layer of hydrogel deposited on at least one side of the substrate at a thickness of 0.1 to 25 micrometers;
  prior to the impregnating the pores, at least one of: cleaning the pores and removing air from the pores;
  submerging the substrate in alcohol;
  wherein the hydrogel comprises poly(vinyl alcohol) selected to have a purity of at least 99 wt. %; and
  wherein at least 95 wt. % of the hydrogel is hydrolyzed.

In a further aspect, a membrane with tolerance for pH levels approaching 1.0 that is selective for multi-valent ionic species includes any combination of the following features:
  a microporous, polymeric membrane;
  a hydrogel impregnated in the membrane;
  wherein the hydrogel is selected from: poly(vinyl alcohol), poly(acrylic acid), poly(ethylene glycol), and combinations thereof;
  wherein the polymeric membrane consists of at least one of polyethylene and polypropylene;
  wherein the polymeric membrane is effectively free of any air bubbles;
  wherein the polymeric membrane has a porosity of between 30% and 80% and more preferably between 40% and 60%;
  wherein the polymeric membrane has a thickness of between 25 and 200 micrometers prior impregnation of the hydrogel;
  wherein the polymeric membrane has a thickness of less than 200 micrometers after impregnation of the hydrogel;

In a final aspect, a method of making and operating a flow battery may include any combination of the following features:
  providing or forming a composite membrane according to any aspect disclosed herein;
  providing first and second electrolytes, each having multi-valent ionic species dissolved therein, on opposing sides of the composite membrane; and
  circulating the first and second electrolytes through separate flow paths in response to an electric load or a charging load;
  wherein the multi-valent ionic species include at least one: vanadium ($2^+$) ions, vanadium ($3^+$) ions, vanadium ($4^+$) ions, vanadium ($5^+$) ions, cuprous ions, cupric ions, ferric ions, and ferrous ions;

wherein the first electrolyte comprises ferric ions and the second electrolyte comprises ferrous ions; and wherein at least one of the first electrolyte and the second electrolyte has a pH of less than 3.0, more preferably less than 2.0, and most preferably less than 1.5.

Although the foregoing features are separately identified as distinct aspects of the invention, it will be understood that this disclosure also contemplates combining features from one disclosed aspect above with any of the other aspects. To the extent one aspect may encompass a method and a separate aspect may encompass an apparatus, the means for adapting the method to the apparatus (and vice versa) are similarly contemplated and disclosed.

BRIEF DESCRIPTION OF THE DRAWINGS

The accompanying drawings illustrate various systems, apparatuses, devices and related methods, in which like reference characters refer to like parts throughout, and in which.

DETAILED DESCRIPTION

Figure 1:
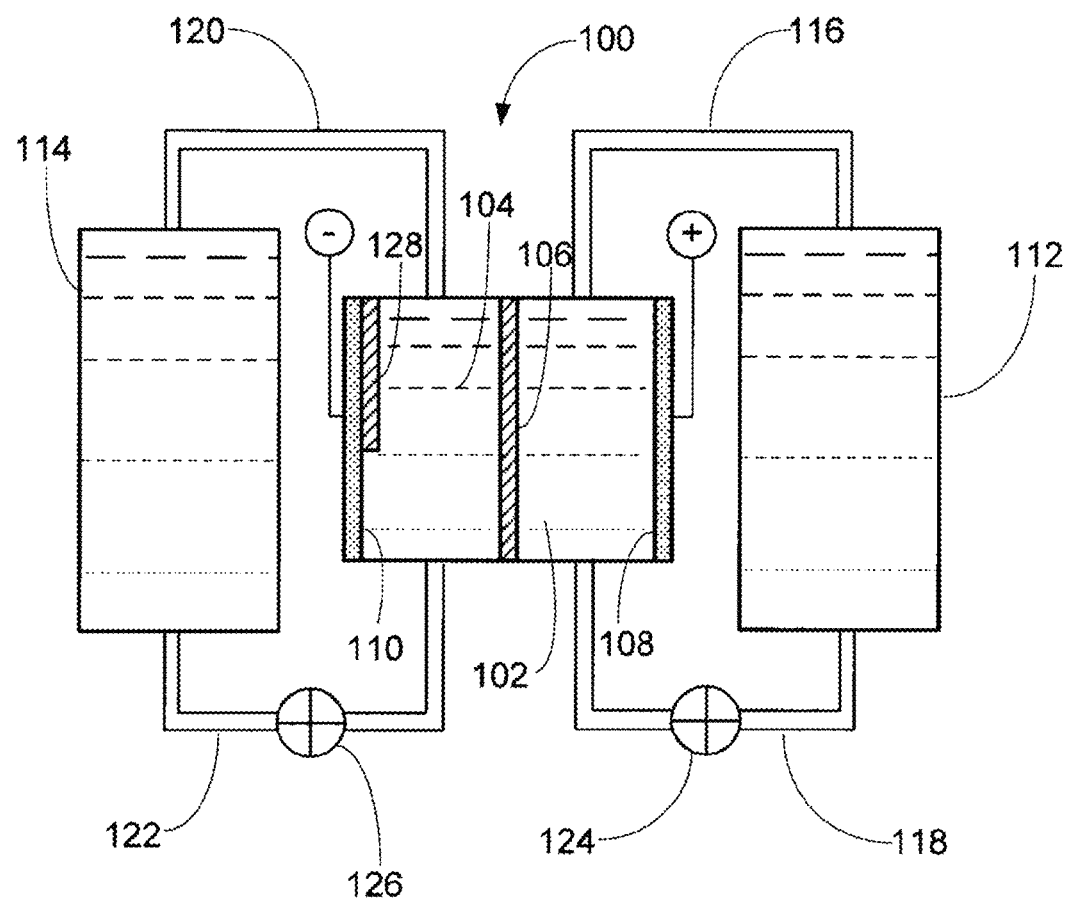
FIG. 1 is a schematic illustration of a hybrid flow battery.

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, unless context suggest otherwise, the articles "a" and "an" are generally intended to mean "one or more" and the use of plural may be exemplary rather than mandatory.

Hydrogel forming materials such as poly(vinyl alcohol), poly(acrylic acid) or poly(ethylene glycol), and blends of two or more of these materials, have found use in electrochemical cells. For example, U.S. Pat. No. 5,211,827 describes a conventional electrochemical cell using a solid, nonporous composite membrane formed by dispersing hydrogel uniformly through an inert matrix. In the same manner, U.S. Pat. No. 4,614,575 describes the use of non-ionic aqueous gels to facilitate electrolyte distribution while preventing gas percolation in a variety of electrochemical systems. Generally speaking, the use of non-ionic poly(vinyl alcohol) gel film separators in alkaline silver-zinc batteries dates back even further. In all cases, the challenges or incorporating soluble PVA membranes in a single aqueous electrolyte, along with lower cost, less complex alternatives, may have contributed to the relative dearth of further development of PVA separators.

For conventional batteries, the necessary ionic conduction through the hydrogel occurs as the liquid battery electrolyte penetrates and swells the hydrogel. The cross-linking is necessary to control the degree of swelling and to prevent the hydrogel polymer from dissolving in the electrolyte. For fuel cells, an ionomer such as poly-styrene sulfonic acid or NAFION® is usually incorporated into the separator. Conduction then occurs when water is taken up by the hydrogel and allows the acid groups of the ionomer to become ionized, freeing up a proton for conduction. However, NAFION® and other ionomers may take up (i.e., absorb and hold) multi-valent cations ($V^{2+}$, $Fe^{2+}$, $Cr^{3+}$, etc.) relative to $H^+$, $Na^+$, and/or $K^+$, so as to cause a significant loss in ionic conductivity that renders flow battery systems relying on multi-valent cations largely inefficient.

Recent literature (e.g., a review by Maiti in *The Journal of Power Sources*, vol. 216, pages 48-66, 2012) has suggested modification of PVA by sulfonation or incorporation of hydrophobic or other components could prove useful for PVA-based membranes for direct methanol fuel cells, given PVA's high selectivity for water to alcohol. However, these structures rely on creating ionomeric properties in the membrane.

In contrast to the use of similar membranes for conventional batteries and fuel cells, separators/membranes for flow batteries must provide ionic conductivity and also prevent (or at least minimize) the transfer of the dissolved ionic reactants from the positive electrolyte to the negative electrolyte and vice-versa. That is, reactant transport and, in particular, transport via hydraulic permeability are significant questions unique to flow batteries which limit the use of conventional battery and fuel cell separators (e.g., low-cost microporous membranes) in flow batteries.

Reactant transfer can be driven by 1) the naturally occurring concentration gradients (i.e, by diffusion), by 2) the naturally occurring difference in electrical potential (i.e., by migration) or by 3) differences in pressure (total or osmotic) that result in the bulk transfer of liquid electrolyte across the membrane (hydraulic permeation). In conventional batteries, only the ions of the supporting electrolyte, such as potassium and hydroxyl ions for an alkaline battery, are present in the electrolyte, so that reactant transfer is not an issue. In fuel cells, the unwanted transport of fuel (hydrogen or methanol) molecules may be an issue, but these materials are not ionic and their transport is controlled by different factors. Only in flow batteries is conduction of some ions desired while conduction of other ions is to be minimized, and only in flow batteries is hydraulic permeation of electrolyte an issue to be avoided.

Thus, the inventors now propose to leverage the benefits of microporous membranes as support structures in combination with hydrogels, and particularly crosslinking and conductive materials such as poly(vinyl alcohol), as safeguards against extremes in pressure differentials in flow batteries. The resulting structures significantly reduce the shortcomings of only using microporous membranes in flow batteries, while simultaneously realizing significant cost savings in comparison to NAFION® and other ionomers/ion exchange materials.

Further, the optimal configuration of a composite separator using a hydrogel in flow batteries is unique in comparison even to the comparable disclosures of hydrogel in electrochemical cells, as observed above and elsewhere in the literature. The combination of hydrogel and membrane in the circumstances that are specific to flow batteries (i.e., hydraulic permeation, diffusion, etc.) entail factors such as the pore size and pore volume of the porous support, the composition and amount of hydrogel forming material and its degree of cross-linking, and whether or not the hydrogel material forms a continuous film on the surface of the support and/or partially or completely fills the pores of the support. Insofar as these factors are not relevant to or, to the inventors knowledge, even considered in the prior art with respect to conventional electrochemical cells, the composite and system contemplated herein is unique.

In addition to semi-crystalline, near-completely hydrolyzed PVA (see below) as a component of composite membranes for flow batteries, many other options are envisioned. For example, PVA modified with crosslinkable moieties (e.g., acrylates, epoxides) can be used to infiltrate porous separator materials followed by thermal, chemical or photochemical crosslinking. Alternatives to PVA which are also not ionomers include hydrophilic polymers such as poly(ethylene oxide) or PEO, poly(N-vinyl pyrrolidone) or PVP, poly(2-hydroxyethyl methacrylate) or polyHEMA and the like, poly(acrylamide) and various derivatives and copolymers, and poly(ethyl-2-oxazoline) and related materials, with appropriate crosslinking, either physical or chemical, to render these materials insoluble in water. Bio-derived hydrophilic polymers, such as chitosan, gelatin and hyroxypropyl cellulose, may also be considered.

Blends of one or more of these polymers may also be of interest. One or more blend components may include a polyelectrolyte, such as poly(acrylic acid) or a neutralized derivative such as poly(sodium acrylate), and various copolymers of acrylic acid with, for example, acrylamide, in various amounts. Bio-derived polyelectrolytes, such as alginate and hyaluronic acid, may also be considered.

Multi-layer composite membranes are also envisioned, such as a layer of cross-linked PVA sandwiched between two conventional porous separators. This would provide better mechanical stability and protect the relatively soft hydrogel material from being directly exposed to the flowing electrolyte.

The PVA embodiments of the invention should use exceedingly pure forms of the material. Ideally, the poly(vinyl acetate) precursor commonly used to create the final alcohol in situ should be at least 90%, at least 95% and, more preferred, at least 99% pure. A failure to utilize sufficiently pure PVA and/or precursor may lead to unwanted impurities and reduced performance of the resulting membrane.

The PVA embodiments include depositing the hydrogel material onto the microporous membrane via film casting, roll-to-roll casting, infiltration, dip-coating, and other techniques. In doing so, the PVA should fill or otherwise effectively block the pores of the microporous separator so as to effectively prevent flow of fluids through the pores. The resulting surface coating on either/both sides of the membrane should have a depth of about 0.1 to 25 micrometers on a single side. In some embodiments, all of the pores are filled. In some embodiments, one or both sides of the separator are coated. Ultimately, the application or deposition of hydrogel must be sufficient to avoid or substantially reduce the aforementioned problems associated with uncoated porous structures.

A pore is considered to be effectively blocked if its effective diameter is reduced by approximately two orders of magnitude (e.g., a 100 nanometer pore is reduced to an effective size of about 1 nanometer, etc.). However, it will be understood that the coating is effectively continuous on its surface, and the effective blocking may involve any of: the complete filling of the pore, significant coating of the interior diameter of the pore along at least a portion of its path through the pore, and/or sufficient filling of the pore at either or both of its surfaces so as to effectively block the pore. Ultimately, the efficacy and/or utility of the membrane is determined by the hydraulic permeation and ionic selectivity aspects of the membrane, and the effective blocking of the pores is merely indicative of these qualities.

Examples of microporous separators appropriate for use with the invention include inert, thin polymer films between 1 to 1000 micrometers (μm) in thickness made from polypropylene and/or polyethylene, including a wide range of molecular weights. Membranes made from or including polytetrafluoroethylene may also be used as support. The pore size for such membranes should be between 0.01 and 1.00 micrometers with a porosity or void volume between 30 to 80%, with more preferred upper and lower ranges bounded by any two values selected from: 30%, 35%, 40%, 45%, 50%, 55%, 60%, 65%, 70%, 75%, and 80% porosity/void volume. The membranes may be uniaxial or biaxial in nature, and the membranes may be comprised of multiple layers of polymeric materials. Other salient traits may include: stability in electrolytes, exposure to active redox species, mechanical properties necessary to support a free-standing membrane, surface traits that are compatible with hydrogel penetration and coating, and wettability (both for cleaning/removal of air bubbles, as well as for penetration of the hydrogels). Preferred characteristics are further highlighted in the examples below, which should be understood as encompassing certain aspects of the invention.

Surprisingly, the inventors determined that these composite membranes possessed improved wettability (in comparison to the microporous membrane alone) and unexpectedly lower resistance (i.e., equal to or less than 0.3 ohm-cm$^2$). Further, the inventors believe these composites may possess a certain level of ionic selectivity with respect to ferrous and ferric ionic species as compared to other cationic species. Additional testing may show similar utility with respect to selectivity for vanadium, copper, and possibly other flow battery and hybrid-type systems. In this context, ionic selectivity means that the relatively larger, multi-valent cations may be conducted through the membrane, but at a slower rate than the smaller diameter monovalent cations. In this manner, the composite membrane can be contrasted with NAFION® and other ionomers, in which a physical partitioning is accomplished by the uptake of the cations into the NAFION® material itself. While not wishing to bound by any specific theory, the inventors believe their composite membrane may be effectively nanoporous in this regard, by hindering the passage of larger cations, and the composite membranes may be likened to nanofiltration membranes in this regard and in contrast to more porous microfiltration and ultrafiltration membranes (useful in capturing molecular weight materials in excess of 10,000, such as proteins), but less porous than reverse osmosis membranes (useful in trace organics and monovalent cations).

Finally, the composite separators exhibited sufficient ionic conductivity within the appropriate ionic species (i.e., greater than 0.01 S/cm), particularly in comparison to the current industry standard ionomeric membranes, like Nafion®. Ionic conductivity performance may also be reflected by the comparative performance of membranes with and without the invention, as reflected by the battery's discharge, cycling, and/or charging performance, as well as its rate capability and overall capacity. Additionally, related measures, such as resistance measurements (e.g., area specific resistance), may be useful in verifying the improved ionic conductivity of the invention in comparison to previous membranes.

Ionic conductivity may be measured by equilibrating a membrane in a given electrolyte. Equilibrating includes immersing the membrane and allowing sufficient time for complete wetting of the membrane. Comparative (i.e., with and without membrane present) or multi-point measurements (i.e., on and away from the membrane on both of its sides) may be taken to determine conductivity. Diffusion coefficients may also be calculated and compared.

For certain polymeric substrates, it may be advantageous to ensure all unwanted substances are first purged from the pores prior to the introduction of hydrogel materials. This may be accomplished according to any number of procedures, including flushing the pores clear of any resident oils or other residual components from original manufacturing processes by way of one or more solvents. In addition, it may be advisable to pre-wet the membrane to avoid trapping air within the pores, which may lead to unwanted reactions. In either of these regards, methanol and other alcohols are particularly useful. In practice, the substrate is "pre-wetted" with the alcohol and then introduced into an aqueous solution so as to ensure air bubbles have been evacuated and/or that the hydrogel/PVA may be immediately taken up within the pores.

The composite membranes contemplated herein may be particularly useful in the ferric-ferrous chemistry and in other multi-valent ionic flow battery chemistries (both traditional and hybrid). Additives may be employed allowing sustained operation at pH as low as 1.0 or less in a mixed sulfate/chloride electrolyte without experiencing infeasible levels of hydrogen evolution. Also, these electrolytes are sufficiently conductive to forego possible ferric hydroxide precipitation. Preferred pH levels for the electrolytes is less than 3.0, less than 2.0, less than 1.5, and less than or equal to 1.0.

The composite hydrogels may include mixtures of PVA, poly(acrylic acid), and poly(ethylene glycol). The resulting bonding within the porous support may be covalent, ionic, or a combination of the two. The hydrogel itself may also be partially cross-linked according to a variety of known methods to improve its structural stability, particularly with respect to minimized swelling and avoidance of dissolution of the hydrogel material(s) themselves. In some aspects, 3 wt. % aqueous solutions of highly hydrolyzed PVA (i.e., at least half and, more preferably, approaching 90% of the material) are coated onto the microporous substrates, followed by one or a series of methanol treatments lasting several hours in order to stabilize the PVA structure, increase crystallinity, and promote PVA-PVA interactions while minimizing PVA-water interactions.

Notably, flow batteries present unique challenges and opportunities, in comparison to previous suggested uses of PVA in conventional batteries and fuel cells, because of the need for selective ionic conduction and sufficient physical segregation of the respective aqueous mixtures inherent to the opposing cells of a flow battery. These considerations are in direct contrast to conventional batteries and fuel cells, where pressure gradients and/or hydraulic crossover are not as significant of concerns. While it is true that fuel cells may experience fuel crossover, the art of fuel cells are entirely unconcerned with ion crossover.

As described herein, resistance to hydraulic permeation may mean a thickness normalized hydraulic permeability, inclusive of the coating thickness, ($k_w/t_m$ in $cm^2/cm$) of less than or equal to $9 \times 10^{-12}$ and or absolute values of less than or equal to $10^{-14}$ $cm^2$ (for comparison, an open and unblock space will have a large hydraulic permeation value significantly greater than 1.000000). Another comparative metric for this resistance the relative amount by which a membrane against one that has been coated according to the aspects described herein compares against an uncoated membrane, with a reduction in permeability of at least 25 times in the coated membrane considered to be resistant. Pressure gradients between half cells may also be indicative of unwanted hydraulic crossover. Other measures, including indirect means such as absolute or comparative full or half performance on discharge, cycling, and/or charging, as well as the rate capability and capacity of the resulting cell, may also be viable indicators of improved and acceptable hydraulic permeation resistance.

Owing to the ability for PVA and other hydrogels to crosslink, it may be possible to rely on extremely porous substrates (approaching 80% porosity or more). In some aspects, a completely self-supported membrane can be formed entirely from hydrogel. Such self-supported hydrogels comprise extremely pure PVA that may tolerate temperatures at or above 50°-60° C. In other aspects, sufficient purity of PVA (i.e., greater than 95%) may result in the formation of crystalline structures in which the hydrolyzed PVA may self-crosslink. Extremely porous substrates may comprise a simple mesh formed from threaded or woven screen-like materials, expanded materials having regularly or irregularly formed apertures, and/or other planar materials having apertures formed therein.

While the composite membrane is expected to have particular utility in multi-valent flow batteries, and especially all iron systems, the composite membranes described herein also exhibit ionic selectivity for monovalent cations. For example, electrolyte conductivity even in liquid solutions of $K^+$ or $NH_4^+$ and $Cl^-$ can remain comparable. Separately, lower pH levels, in combination with possible hydrogen suppressants based on vanadium, further improves the performance of the composite membrane in multi-valent systems.

The composite membranes also show no apparent degradation when cycled both at room temperature and elevated temperature (50° C.).

The methods described in the specific examples below encompass other aspects of the invention. Although specific equipment is disclosed, reasonably comparable implements and techniques are encompassed by certain embodiments of the inventive method. In the same manner, the flow battery systems described herein constitute certain embodiments of the invention, especially to the extent the use of the composite membrane simplifies and improves the performance and components of the overall system.

FIG. 1 illustrates an embodiment of a flow battery system 100 suitable for use in connection with aspects of the present invention. Flow cell 100 includes two half-cells 102 and 104 separated by a separator 106. Half cells 102 and 104 include electrodes 108 and 110, respectively, in contact with an electrolyte such that an anodic reaction occurs at the surface of one of the electrodes and a cathodic reaction occurs at the other electrode. Electrolyte flows through each of the half-cells 102 and 104 as the oxidation and reduction reactions take place. In FIG. 1, the cathodic reaction takes place during discharge in half-cell 102 at electrode 108 (which is referred to herein as the positive electrode or the cathode), and the anodic reaction takes place during discharge in half-cell 104 at electrode 110 (which is referred to herein as the negative electrode or the anode).

The electrolyte in half-cells 102 and 104 flows through the system to storage tanks 112 and 114, respectively, and fresh/regenerated electrolyte flows from the tanks back into the half-cells. In FIG. 1, the electrolyte in half-cell 102 flows through pipe 116 to holding tank 112, and the electrolyte in tank 112 flows to the half-cell 102 through pipe 118. Similarly, the electrolyte in half-cell 104 can flow through pipe 120 to holding tank 114, and electrolyte from tank 114 flows through pipe 122 to half-cell 104. The systems can be configured as desired to aid or control the flow of electrolyte through the system and may include, for example, any suitable pumps or valve systems. In the embodiment depicted in FIG. 1, the system includes pumps 124 and 126 to pump the electrolyte from tanks 112 and 114, respectively to the half-cells. In some embodiments, the holding tank can segregate electrolyte that has flowed through the respective cells from electrolyte that has not. However, mixing discharged or partially discharged electrolyte can also be performed.

Electrodes 108 and 110 can be coupled to either supply electrical energy or receive electrical energy from a load or source. Other monitoring and control electronics, included in the load, can control the flow of electrolyte through half-cells 102 and 104. A plurality of cells 100 can be electrically coupled ("stacked") in series to achieve higher voltage or in parallel in order to achieve higher current.

Figure 2:
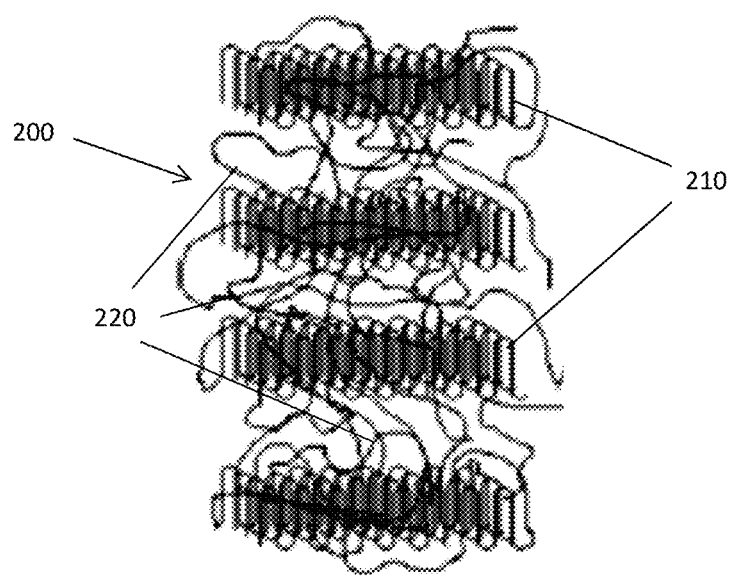
FIG. 2 is a schematic representation of cross-linking within the hydrogel.

In some aspects, preferred composite membranes will include a stable carbon backbone formed from the PVA. The PVA will be at least semi-crystalline, as exemplified in the general molecular schematic in FIG. 2, to afford stability in water without the need for covalent crosslinking. In that Figure, hydrogel material 200 includes a PVA backbone 210 with selective crosslinks 220 formed between each backbone structure 210. The composite will also be non-ionomeric, including the absence of any ionic groups such as sulfonate or carboxylates that might otherwise chelate multivalent ions, and especially ferrous and ferric ions.

EXAMPLES

PVA and PVA Composite Separator Preparation

Solutions of 2 wt. % and 3.5 wt. % poly(vinyl alcohol) or PVA (Sigma-Aldrich, 99+% hydrolyzed, avg. molecular weight about 130 kD) in water were prepared by dissolution of the PVA at about 85° C. with occasional stirring followed by cooling to room temperature, resulting in transparent, mildly viscous solutions. Microporous polymeric separators, as indicated below, were coated with the solution of poly (vinyl alcohol) using a doctor blade and/or by dip-coating. The wet composite film was dried by heating in an oven in air at 50° C. for 15 minutes. The resulting composite was then soaked in pure methanol for 16 hours to extract any remaining water from the composite membrane and to attempt to increase the partial crystallinity, and hence mechanical strength and stability in water, of the poly(vinyl alcohol) via physical crosslinking.

PVA films were coated using a casting knife film applicator and then polymerized in methanol. The thickness of the PVA coating was controlled with the vertical adjustment of the blade. After polymerization, the composite separator thickness was measured using a micrometer. The properties of the underlying microporous support materials is summarized in Table 1. Table 2a indicates properties of PVA-only membranes.

Ionic Conductivity Studies

Electrochemical impedance spectroscopy (EIS) was implemented using a Solartron 1280B potentiostat (Ametek, UK) to obtain the ionic conductivity of coated and uncoated separators. The ionic conductivity of both the uncoated microporous separator and PVA composite separator was measured in 1M HCl electrolyte in an in-house designed and fabricated conductivity cell. The in-house cell consists of two CPVC flow fields and graphite current collectors 1 cm wide and 3.69 cm long (A=3.69 cm$^2$). The gap between each current collector and the separator was 1 mm as defined by a Teflon spacer. Current was collected from this cell through two brass plates that were pressed into the back of the graphite current collectors. Grafoil (Graftech, USA) was used to minimize contact resistances between the brass plates and the graphite current collectors. The electrolyte was pumped vertically though the in-house cell via a peristaltic pump (Cole-Parmer, USA) to an external reservoir during all measurements. The conductivity values were determined at room temperature. The resistance measurement without the membrane sample was subtracted from the resistance measurement with the membrane sample to yield the resistance due to the membrane. This final resistance value was used to calculate the membrane conductivity.

Hydraulic and Ferric Ion Crossover Studies

Crossover studies were conducted with both the coated and uncoated separators in a 6.5 cm$^2$ cell with conductive carbon felt electrodes pressed against the separator on both sides. Two separate external reservoirs were used for both studies. During ferric ion crossover studies, equal flow rates were employed to ensure there was no pressure differential across the separator that might impact the results. One reservoir with 250 mL of concentrated electrolyte consisting of 1M $FeCl_2$ and 1M $FeCl_3$. The other reservoir consisted of 250 mL of a dilute electrolyte with 1M $FeCl_3$, small amount of concentrated HCl to balance the pH with the concentrated side, and 2M $NH_4Cl$ to match the amount of $Cl^-$ with the concentrated side. Maintaining a pH balance enables ferric and ammonium ion gradients. Crossover measurements were thus performed with a concentration difference (delta C) of 1 Mol/liter for the ferric ion. An applied potential of 0.5V across the cell allowed the flux of ferric ions crossing the membrane to be detected as an oxidation current. The effective diffusivity of the ferric ion, $D_{eff}$, was then calculated as: [(current*thickness)/(nF*deltaC)].

Correspondingly, hydraulic crossover studies were conducted with the same 6.5 cm$^2$ cell with carbon felt electrodes on both sides. Both reservoirs were filled with 150 mL of DI water and a few drops of HCl to maintain conductivity. The two reservoirs were placed with a 31" height differential during flow to create a pressure differential across the separator. The change in the liquid volume in each reservoir over time was monitored and Darcy's law was used to extract the hydraulic permeability. The hydraulic and ferrous ion permeation values were determined at room temperature.

Results

This concept was tested with two commercial microporous separators, Celgard 2325, a tri-layer material consisting of two layers of porous polypropylene sandwiching a single layer of porous polyethylene developed primarily for Li-ion batteries, and Daramic 175, a single layer of porous polyethylene which also contains dispersed silica particles intended for use in lead-acid batteries. Relevant properties of these materials are given in Table 1 below. Measurements of the thickness of the composite separators with a thin coating of PVA showed that in both cases the thickness was unchanged from that of the porous support, indicating that the PVA was taken up into the pores of the support and did not form a film on the surface. When a thicker coating was applied, the thickness of the composite was increased. The properties of the composite separators were then compared to those of the uncoated materials and the results are given in Tables 2-4 below.

Table 2a shows characteristics of pure PVA membranes. While such membranes are possible, they entail certain structural/physical limitations and were found to be more difficult to work with in comparison to the composites. The ionic conductivity of the pure PVA films was very high (~54% of the electrolyte conductivity). This demonstrates the high proton conductivity through the film. The thicker PVA separator maintained its mechanical integrity throughout the duration of the flow tests.

From Table 2b, it should be noted that there was negligible change in ionic conductivity of the coated composite Daramic compared to the uncoated. This can be attributed to non-homogenous filling of the larger pores within. However, the coated Daramic maintained its ionic conductivity without any significant increase in areal resistance. Moreover, the ionic conductivity of the monlayer Celgard 2400 increased dramatically with coating thickness. This suggests the filling of the nano-scale pores with the PVA films to enable enhanced wettability for electrolyte transport. It is further posited that, not only did the PVA take up electrolyte and allow ionic conduction, but that the PVA in the pores of the support for these composites may have improved the wettability of the support, allowing for higher level of conductivity despite taking up part of the pore volume. With a thicker coating of PVA on either separator, the conductivity of the composite material did drop, but remained acceptable for a flow battery.

From Table 3 it can be seen that for the Celgard separators, the PVA composite material had a significantly lower diffusion rate for the ferrous ion, indicating that although the ionic conductivity improved; the diffusion of a reactant ion was hindered as desired. However, this result was not observed for the coated Daramic sample, which had a similar or somewhat higher diffusivity for ferrous ion than the uncoated sample. This may indicate that the amount of PVA in the Daramic composite was not optimal which may be related to the fact that both the pore size and pore volume in the Daramic material are larger than in the Celgard separator.

From Table 4, it can be seen that the hydraulic permeability in both cases was lowered by incorporating PVA on and into the porous supports. This again is a desirable result, although the magnitude of the decrease in the first series of samples was small. For the second set of samples, where sufficient PVA was coated on the support to yield a significantly thicker film, the hydraulic permeability was roughly one order of magnitude lower. This shows that with optimization of the amount of PVA in the composite membrane, it should be possible to significantly lower the hydraulic permeability while maintaining an acceptable level of conductivity.

TABLE 1a

Properties of the microporous supports

| | Thickness (μm) | Porosity | Pore size (μm) |
|---|---|---|---|
| Celgard 2325 | 25 | 39% | 0.028 avg. for the polypropylene layers |
| Celgard 2400 (Polypropylene) | 25 | 41% | 0.035 avg. for the polypropylene layers |
| Daramic 175 | 175 | 58 ± 8% | 0.1 avg. 1.0 max |

TABLE 2a

Ionic Conductivity of pure PVA separators in contact with Liquid Electrolyte (1M HCl).

| Membrane | Thickness of separator (cm) | Conductivity S/cm | Areal Resistance Ohm cm$^2$ |
|---|---|---|---|
| "Thin" PVA | 0.002-0.0025 | 0.116 | 0.022 |
| "Thick" PVA | 0.01-0.0125 | 0.116 | 0.029 |

TABLE 2b

Ionic Conductivity of PVA coated and uncoated Celgard and Daramic separators in contact with Liquid Electrolyte (1M HCl).

| Membrane | Thickness of separator (cm) | Conductivity S/cm | Areal Resistance Ohm cm$^2$ |
|---|---|---|---|
| Uncoated Daramic | 0.0175 | 0.11 | 0.16 |
| PVA coated Daramic –10 μm coating | 0.0185 | 0.107 | 0.17 |
| PVA coated Daramic –20 μm coating | 0.0195 | 0.106 | 0.18 |
| PVA coated Daramic –60 μm coating | 0.0235 | 0.087 | 0.27 |
| Uncoated Celgard 2400 (monolayer) | 0.0025 | 0.066 | 0.040 |
| PVA coated Celgard 2400 –10 μm coating | 0.0035 | 0.098 | 0.035 |
| PVA coated Celgard 2400 –20 μm coating | 0.0045 | 0.110 | 0.041 |
| NAFION ® 212 (H$^+$ form) | 0.005 | 0.08 | 0.063 |
| NAFION ® 212 (K$^+$ form) | 0.005 | 0.02 | 0.25 |
| NAFION ® 212 (Fe$^{+2}$ form) | 0.005 | 0.005 | 1.0 |

TABLE 3

Ferrous Iron Effective Diffusivity of PVA coated and uncoated Celgard and Daramic separators

| Membrane | Thickness of separator (cm) | Effective Diffusivity cm$^2$/s |
|---|---|---|
| Uncoated Daramic | 0.0175 | 0.86 – 1.6 × 10$^{-6}$ |
| PVA coated Daramic –10 μm coating | 0.0185 | 1.4 – 1.6 × 10$^{-6}$ |
| PVA coated Daramic –20 μm coating | 0.0218 | n.d. |
| Uncoated Celgard | 0.0025 | 0.25 – 0.26 × 10$^{-6}$ |
| PVA coated Celgard 2400 –10 μm coating | 0.0035 | 0.15 – 0.16 × 10$^{-6}$ |
| PVA coated Celgard 2400 –20 μm coating | 0.0042 | n.d. |
| NAFION ® | 0.02 | 0.27 × 10$^{-6}$ | n.d. = not determined

TABLE 4

Hydraulic Permeability of PVA coated and uncoated Celgard and Daramic separators

| Membrane | Thickness of separator (cm) | Permeability, $k_w$, cm$^2$ | $k_w$/thickness, cm |
|---|---|---|---|
| Uncoated Daramic | 0.0175 | $1.2 \times 10^{-13} - 1.3 \times 10^{-13}$ | $7 \times 10^{-12}$ |
| PVA coated Daramic –10 μm coating | 0.0185 | $8.8 \times 10^{-14} - 1.3 \times 10^{-13}$ | $5.4 \times 10^{-12}$ |
| PVA coated Daramic –20 μm coating | 0.0218 | $1.5 \times 10^{-14} - 3.5 \times 10^{-14}$ | $1.1 \times 10^{-12}$ |
| Uncoated Celgard | 0.0025 | $3.0 \times 10^{-14} - 3.8 \times 10^{-14}$ | $1.4 \times 10^{-11}$ |
| PVA coated Celgard 2400 –10 μm coating | 0.0035 | $2.8 \times 10^{-14} - 3.3 \times 10^{-14}$ | $8.6 \times 10^{-12}$ |
| PVA coated Celgard 2400 –20 μm coating | 0.0042 | $3.1 \times 10^{-15} - 7.1 \times 10^{-15}$ | $1.2 \times 10^{-12}$ |
| NAFION ® | 0.005 | $\approx 5 \times 10^{-16}$ | $1 \times 10^{-13}$ |

TABLE 5

Battery performance of iron flow battery over 2 days at 50° C. with PVA coated Daramic at 10 micrometers and overnight equilibration in 3M HCl.

| | Separator Resistance Ohm cm$^2$ | $Fe^{+3}$ crossover current density mA/cm$^2$ | Voltaic (VE) and Coulombic Efficiencies (CE) @ 100 mA/cm$^2$ |
|---|---|---|---|
| Uncoated Daramic | 0.54 | 8.1 | VE 71% CE 75-90% |
| Coated, 1$^{st}$ day | 0.60 | 4.0 | VE 76% CE 97% |
| Coated 2$^{nd}$ day, Lower Fe conc. | 0.60 | 3.3 | VE 73% CE 95% |

The foregoing description and examples identify various non-limiting embodiments of the invention. Use of the term "flow battery" may also include hybrid flow batteries where appropriate. References to positive and negative electrodes should be understood in the context of a discharge reaction unless otherwise noted or apparent from the context.

Any explicit or implicit range of values indicated in this specification necessarily includes the disclosure of a plurality of intervals between the lower and upper boundaries of the range. As a non-limiting example, a stated range of 0.01 micrometers to 1.0 micrometers encompasses any combination of intervals between those upper boundaries, including any two selected from 0.1, 0.2, 0.3, 0.4, 0.5, 0.6, 0.7, 0.8, and 0.9 even if the specific intervals are not expressly identified. In the same manner, any values provided in the examples will be deemed to constitute disclosed lower or upper limits when considered in combination with other values from that same dataset. Ratios and other limitations may also be inferred by comparing comparable values disclosed herein.

All measurements should be read in context and with reference to the most common units and means of measurement, as will be readily understood by persons of skill in this field. Unless noted to the contrary, all measurements are conducted in ambient temperatures and pressures, with percentages referring to mass unless otherwise noted. Modifications may occur to those skilled in the art and to those who may make and use the invention. The disclosed embodiments are merely for illustrative purposes and not intended to limit the scope of the invention or the subject matter set forth in the claims.

What is claimed is:

1. A flow battery system comprising:
    a positive electrolyte flowing through a positive reaction chamber and a negative electrolyte flowing through a negative reaction chamber, wherein at least one of the positive electrolyte and the negative electrolyte consists of an aqueous solution;
    a non-ionomeric membrane comprising hydrogel impregnated into pores of a microporous polymeric substrate, said non-ionomeric membrane: (i) physically separating the positive reaction chamber from the negative reaction chamber so as to prevent any flow of fluid through the pores; (ii) being ionically conductive but resistant to hydraulic crossover; and (iii) not containing any sulfonate or carboxylate ionic groups; and
    wherein the hydrogel consists of poly(vinyl alcohol).

2. The flow battery according to claim 1, wherein the poly(vinyl alcohol) is semi-crystalline and at least 95 wt. % hydrolyzed.

3. The flow battery according to claim 1, wherein at least one of the positive and negative electrolytes comprise a multi-valent ionic species.

4. The flow battery according to claim 1, wherein the hydrogel effectively blocks all pores of the microporous polymeric substrate.

5. The flow battery according to claim 1, wherein the microporous polymeric substrate consists of polyethylene, polypropylene, or combinations thereof.

6. The flow battery according to claim 1, wherein the polymeric substrate has a void volume between 30% and 80%.

7. The flow battery according to claim 1, wherein the polymeric substrate has a thickness of between 25 and 200 micrometers prior to being impregnated by the hydrogel.

8. The flow battery according to claim 1, wherein the aqueous solution has a pH of less than 3.0.

9. The flow battery according to claim 1, wherein the hydrogel is hydrolyzed and crosslinked.

10. The flow battery according to claim 1, wherein both the positive and the negative electrolytes comprise separate aqueous solutions.

11. The flow battery according to claim 1, wherein the non-ionomeric membrane has a conductivity greater than 0.01 S/cm relative to a 1M HCl solution.

12. The flow battery according to claim 1, wherein the non-ionomeric membrane has a normalized hydraulic permeability of less than or equal to $9 \times 10^{-12}$ cm$^2$/cm.

13. The flow battery according to claim 1, wherein the hydrogel is deposited on at least one side of the substrate at a thickness of 0.1 to 25 micrometers.

14. The flow battery according to claim 1, wherein the hydrogel is hydrolyzed and has a purity of at least 99 wt. %.

15. The flow battery according to claim 1, wherein the positive and negative electrolytes each comprise a multivalent ionic species selected from ferric or ferrous ions.

* * * * *